United States
McCrobie

[11] 3,817,599
[45] June 18, 1974

[54] PROJECTION LENS WITH ADD LENS ELEMENTS
[75] Inventor: George L. McCrobie, Upland, Calif.
[73] Assignee: Xerox Corporation, Stamford, Conn.
[22] Filed: Mar. 21, 1973
[21] Appl. No.: 343,331

[52] U.S. Cl. .................. 350/183, 350/215, 350/216, 350/222
[51] Int. Cl. .......................................... G02b 15/02
[58] Field of Search ............ 350/183, 215, 216, 222

[56] References Cited
UNITED STATES PATENTS
1,553,211  9/1925  Barr et al. ............................. 350/183
2,975,674  3/1961  Tibbetts et al. ....................... 350/183
3,363,964  1/1968  Macher ................................. 350/183

*Primary Examiner*—Ronald L. Wibert
*Assistant Examiner*—Conrad Clark

[57] ABSTRACT

A projection lens for operation between fixed conjugates includes a pair of add lenses for selective combination with the basic lens for changing the magnification of the system. The basic lens operates at unity magnification, with one add lens at 0.74X and with the other add lens at 0.65X magnifications.

4 Claims, 3 Drawing Figures

PROJECTION LENS WITH ADD LENS ELEMENTS

BACKGROUND OF THE INVENTION

This invention relates to a projection lens and in particular to a projection lens for operation between fixed conjugates in which additional lenses are selectively placed in combination for the purpose of changing magnification.

Copying machines are often required to produce copies of an original document or other object that are either enlarged or reduced in size. For the sake of economy in machine design, the overall conjugate length or optical axis is preferably fixed and the lens system is manipulated to obtain the desired magnifications. An example of the type of optical system referred to is disclosed in U.S. Pat. No. 3,741,621, issued June 26, 1973, to George L. McCrobie. In this patent, an add lens projection system is disclosed in which a basic projection lens group is disposed along an optical axis at a first position to provide a 1:1 magnification. A pair of add lens elements is provided which are selectively and alternatively positioned in the optical axis and the entire lens moved to various positions therealong to provide varying magnifications of the projected image. The present invention is a modification of the basic concept disclosed and claimed in U.S. Pat. No. 3,741,621.

It is an object of the present invention to provide a multi-focal projection lens for use between fixed conjugates and which is well corrected for chromatic aberrations, spherical aberration, coma, and astigmatism and which has a substantially flat image field.

DRAWING

DESCRIPTION

Figure 1:
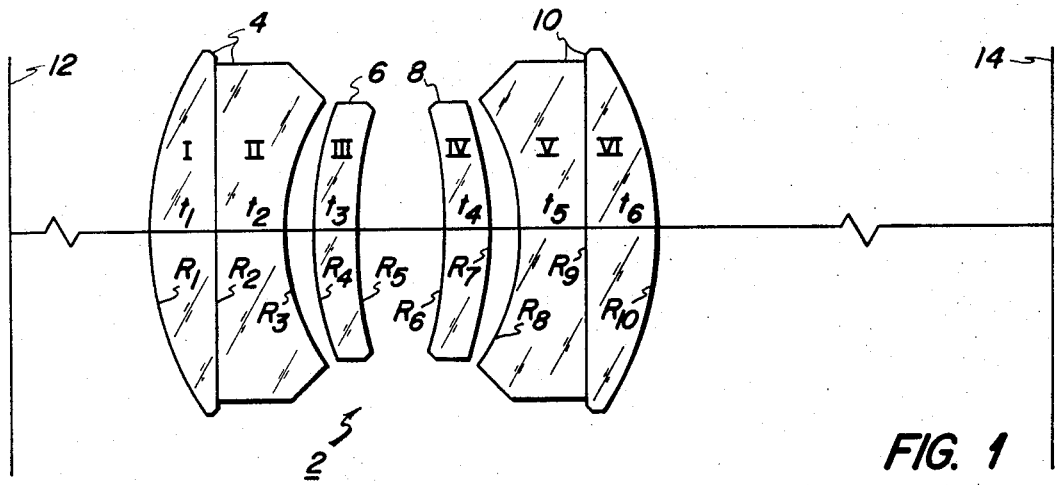
FIG. 1 is an optical diagram of the basic lens group according to the present invention.

Referring now to FIG. 1, a copy lens or projection lens is generally indicated at 2. It includes the following elements disposed in optical alignment:

A front doublet 4, a single lens 6, a single lens 8, and a doublet 10. Lens 2 is disposed between conjugate object and image planes 12 and 14 respectively.

Doublet 4 includes a convex-plano lens element I and a plano-concave lens element II, together forming a convex-concave doublet. Lens 6 is a convex-concave lens, also designated III. Lens 8 is a concave-convex lens, also designated IV. Doublet 10 includes a concave-plano lens element V and a plano-convex lens element VI, together forming a concave-convex doublet.

Figure 2:
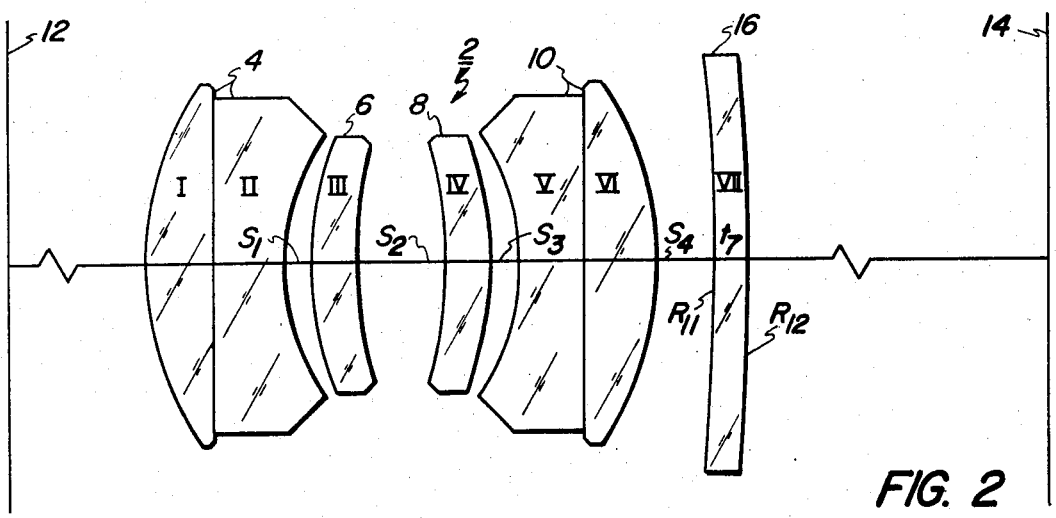
FIG. 2 is an optical diagram of the lens shown in FIG. 1 with a first add lens to provide a desired magnification.

In FIG. 2, a single add lens 16 is positioned between the lens 2 and the image plane 14. Add lens 16 is a concave-convex lens, also designated VII, and suitably mounted for movement into and out of optical alignment with lens 2. The mechanism by which this movement is effected is not material to this invention.

Figure 3:
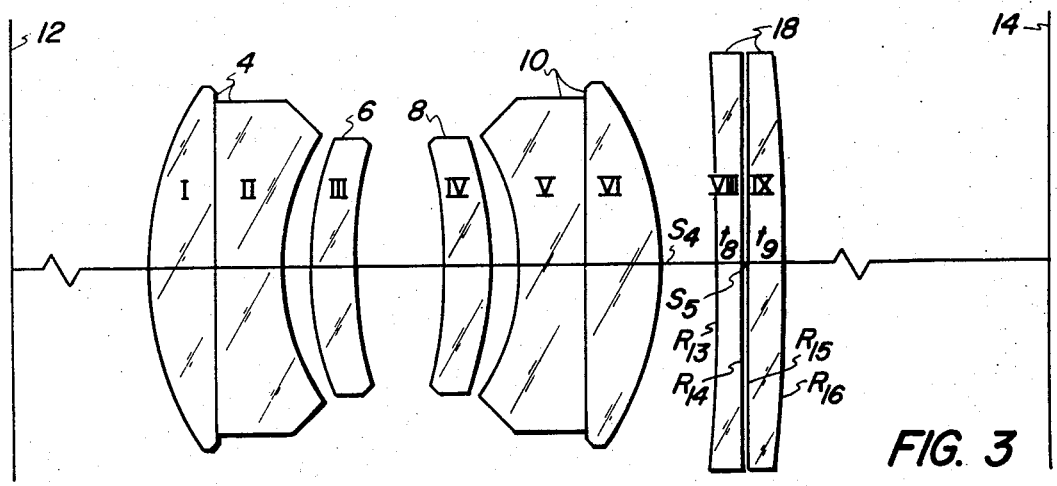
FIG. 3 is an optical diagram of the lens shown in FIG. 1 with a second add lens to provide a different magnification.

In FIG. 3, an add lens 18 is positioned between the lens 2 and the image plane 14. Add lens 18 is a doublet which includes a concave-plano lens element VIII and a plano-convex lens element IX, separated by a small air gap. As with add lens 16, add lens 18 is suitably mounted for movement into and out of optical alignment with lens 2 as desired.

The basic lens 2, shown in FIG. 1, and made according to the following specification, provides a magnification ratio of 1:1.01. In the arrangement of FIG. 2, lens 2 with add lens 16 provides a magnification of 1:0.74×. In the arrangement of FIG. 3, lens 2 with add lens 18 provides a magnification of 1:0.65.

The parameters of the lens elements which make up the above described lens are as listed in the following table in which $N_d$ is the refractive index for the D line of sodium, and is the Abbe number. Radii (R), thicknesses (T), and spacings (S), are expressed in inches and a negative sign indicates radii on centers of curvature lying on the object side of their vertices.

| Lens | Radius (R) | Thickness (T) | Space (S) | Refractive Index (ND) | Abbe Number ($\nu$) |
|---|---|---|---|---|---|
| I | $R_1$=3.5034 | $T_1$=0.754 | | $ND_1$=1.63844 | $\nu_{d1}$=55.42 |
|   | $R_2$=plano | | | | |
| II | | $T_2$=0.724 | | $ND_2$=1.57297 | $\nu_{d2}$=42.58 |
|   | $R_3$=2.5624 | | $S_1$=0.321 | | |
| III | $R_4$=4.0028 | $T_3$=0.516 | | $ND_3$=1.64316 | $\nu_{d3}$=47.96 |
|   | $R_5$=6.1720 | | $S_2$=0.954 | | |
| IV | $R_6$=−6.1720 | $T_4$=0.516 | | $ND_4$=1.64316 | $\nu_{d4}$=47.96 |
|   | $R_7$=−4.0028 | | $S_3$=0.321 | | |
| V | $R_8$=−2.5624 | $T_5$=0.724 | | $ND_5$=1.57297 | $\nu_{d5}$=42.58 |
|   | $R_9$=plano | | | | |
| VI | | $T_6$=0.754 | | $ND_6$=1.63844 | $\nu_{d6}$=55.42 |
|   | $R_{10}$=−3.5034 | | $S_4$=0.580 | | |
| VII | $R_{11}$=−39.3520 | $T_7$=0.360 | | $ND_7$=1.51673 | $\nu_{d7}$=64.17 |
|   | $R_{12}$=−32.7860 | | $S_4$=0.580 | | |
| VIII | $R_{13}$=−62.0090 | $T_8$=0.350 | | $ND_8$=1.61644 | $\nu_{d8}$=36.63 |
|   | $R_{14}$=plano | | $S_5$=0.020 | | |
| IX | $R_{15}$=plano | $T_9$=0.380 | | $ND_9$=1.51105 | $\nu_{d9}$=60.41 |
|   | $R_{16}$=−33.3440 | | | | |

What is claimed is:

1. A lens according to the following specification:

| Lens | Radius (R) | Thickness (T) | Space (S) | Refractive Index (ND) | Abbe Number ($\nu$) |
|---|---|---|---|---|---|
| I | $R_1$=3.5034 | $T_1$=0.754 | | $ND_1$=1.63844 | $\nu_{d1}$=55.42 |
|   | $R_2$=plano | | | | |
| II | | $T_2$=0.724 | | $ND_2$=1.57297 | $\nu_{d2}$=42.58 |
|   | $R_3$=2.5624 | | $S_1$=0.321 | | |
| III | $R_4$=4.0028 | $T_3$=0.516 | | $ND_3$=1.64316 | $\nu_{d3}$=47.96 |
|   | $R_5$=6.1720 | | $S_2$=0.954 | | |
| IV | $R_6$=−6.1720 | $T_4$=0.516 | | $ND_4$=1.64316 | $\nu_{d4}$=47.96 |
|   | $R_7$=−4.0028 | | $S_3$=0.321 | | |
| V | $R_8$=−2.5624 | $T_5$=0.724 | | $ND_5$=1.57297 | $\nu_{d5}$=42.58 |
|   | $R_9$=plano | | | | |
| VI | | $T_6$=0.754 | | $ND_6$=1.63844 | $\nu_{d6}$=55.42 |
|   | $R_{10}$=−3.5034 | | | | |

2. A lens as defined in claim 1 and further including an add lens according to the following specification:

| Lens | Radius (R) | Thickness (T) | Space (S) | Refractive Index (ND) | Abbe Number ($\nu$) |
|---|---|---|---|---|---|
| | | | $S_4$=0.580 | | |
| VII | $R_{11}$=−39.3520 | $T_7$=0.360 | | $ND_7$=1.51673 | $\nu_{d7}$=64.17 |
| | $R_{12}$=−32.7860 | | | | |

3. A lens as defined in claim 1 and further including an add lens according to the following specification:

| Lens | Radius (R) | Thickness (T) | Space (S) | Refractive Index (ND) | Abbe Number ($\nu$) |
|---|---|---|---|---|---|
| | | | $S_4$=0.580 | | |
| VIII | $R_{13}$=−62.0090 | $T_8$=0.350 | | $ND_8$=1.61644 | $\nu_{d8}$=36.63 |
| | $R_{14}$=plano | | $S_5$=0.020 | | |
| IX | $R_{15}$=plano | $T_9$=0.380 | | $ND_9$=1.51105 | $\nu_{d9}$=60.41 |
| | $R_{16}$=−33.3440 | | | | |

4. A multi-focal lens including:
a. a basic lens group according to the following specification:

| Lens | Radius (R) | Thickness (T) | Space (S) | Refractive Index (ND) | Abbe Number ($\nu$) |
|---|---|---|---|---|---|
| I | $R_1$=3.5034 | $T_1$=0.754 | | $ND_1$=1.63844 | $\nu_{d1}$=55.42 |
| | $R_2$=plano | | | | |
| II | $R_3$=2.5624 | $T_2$=0.724 | | $ND_2$=1.57297 | $\nu_{d2}$=42.58 |
| | $R_4$=4.0028 | | $S_1$=0.321 | | |
| III | $R_5$=6.1720 | $T_3$=0.516 | | $ND_3$=1.64316 | $\nu_{d3}$=47.96 |
| | $R_6$=−6.1720 | | $S_2$=0.954 | | |
| IV | $R_7$=−4.0028 | $T_4$=0.516 | | $ND_4$=1.64316 | $\nu_{d4}$=47.96 |
| | $R_8$=−2.5624 | | $S_3$=0.321 | | |
| V | $R_9$=plano | $T_5$=0.724 | | $ND_5$=1.57297 | $\nu_{d5}$=42.58 |
| VI | $R_{10}$=−3.5034 | $T_6$=0.754 | | $ND_6$=1.63844 | $\nu_{d6}$=55.42 | b. a first add lens according to the following specification:

| Lens | Radius (R) | Thickness (T) | Space (S) | Refractive Index (ND) | Abbe Number ($\nu$) |
|---|---|---|---|---|---|
| | | | $S_4$=0.580 | | |
| VII | $R_{11}$=−39.3520 | $T_7$=0.360 | | $ND_7$=1.51673 | $\nu_{d7}$=64.17 |
| | $R_{12}$=−32.7860 | | | | | c. a second add lens according to the following specification:

| Lens | Radius (R) | Thickness (T) | Space (S) | Refractive Index (ND) | Abbe Number ($\nu$) |
|---|---|---|---|---|---|
| | | | $S_4$=0.580 | | |
| VIII | $R_{13}$=−62.0090 | $T_8$=0.350 | | $ND_8$=1.61644 | $\nu_{d8}$=36.63 |
| | $R_{14}$=plano | | $S_5$=0.020 | | |
| IX | $R_{15}$=plano | $T_9$=0.380 | | $ND_9$=1.51105 | $\nu_{d9}$=60.41 |
| | $R_{16}$=−34.3440 | | | | | said first and second add lenses being selectively disposable in optical alignment with said basic lens group to vary the magnification of said lens.

* * * * *